US010453189B2

United States Patent
Awwad et al.

(10) Patent No.: US 10,453,189 B2
(45) Date of Patent: Oct. 22, 2019

(54) PROCESS AND DEVICE FOR DIRECT MEASUREMENTS OF PLANT STOMATA

(71) Applicant: United Arab Emirates University, Al Ain (AE)

(72) Inventors: Falah Awwad, Al Ain (AE); Synan Abuqamar, Al Ain (AE); Taoufik Ksiksi, Al Ain (AE); Saleh Thaker, Al Ain (AE); Ayman Abdul Rahman Rabee, Al Ain (AE)

(73) Assignee: UNITED ARAB EMIRATES UNIVERSITY (AE)

( * ) Notice: Subject to any disclaimer, the term of this patent is extended or adjusted under 35 U.S.C. 154(b) by 0 days.

(21) Appl. No.: 14/968,954

(22) Filed: Dec. 15, 2015

(65) Prior Publication Data

US 2017/0169557 A1    Jun. 15, 2017

(51) Int. Cl.
| | | |
|---|---|---|
| *G06T 7/155* | (2017.01) | |
| *G06T 7/00* | (2017.01) | |
| *G06T 7/60* | (2017.01) | |
| *G06K 9/62* | (2006.01) | |
| *G06K 9/52* | (2006.01) | |
| *G06K 9/46* | (2006.01) | |
| *G06K 9/34* | (2006.01) | |
| *G06T 7/12* | (2017.01) | |
| *G06K 9/44* | (2006.01) | |

(52) U.S. Cl.
CPC .............. *G06T 7/0004* (2013.01); *G06K 9/34* (2013.01); *G06K 9/4604* (2013.01); *G06K 9/52* (2013.01); *G06K 9/6215* (2013.01); *G06T 7/12* (2017.01); *G06T 7/155* (2017.01); *G06T 7/60* (2013.01); *G06K 9/44* (2013.01); *G06T 2207/10056* (2013.01)

(58) Field of Classification Search
CPC .......... G06T 7/0004; G06T 7/60; G06T 5/00; G06T 2207/20112; G06T 2207/20024; G06T 2207/30188; G06K 9/4604; G06K 9/6215; G06K 9/52; G06K 2009/4666
See application file for complete search history.

(56) References Cited

U.S. PATENT DOCUMENTS

| | | | |
|---|---|---|---|
| 2010/0272377 A1* | 10/2010 | Herbig | ............... A61J 19/00 383/64 |
| 2012/0310540 A1* | 12/2012 | McDermitt | ........ G01N 21/6486 702/19 |

(Continued)

OTHER PUBLICATIONS

Dow, Graham J., Dominique C. Bergmann, and Joseph A. Berry. "An integrated model of stomatal development and leaf physiology." New Phytologist 201, No. 4 (2014): 1218-1226.*

(Continued)

*Primary Examiner* — Carol Wang
(74) *Attorney, Agent, or Firm* — Hayes Soloway PC

(57) ABSTRACT

There is provided a computer-implemented method for detecting and measuring stomata present in the epidermis of a plant leaf, the method comprising obtaining an image of the epidermis of a plant leaf; detecting valid stomata candidates within the image; determining physical dimensions of the valid stomata candidates; and determining vital functions of the plant based on the physical dimensions of the valid stomata candidates. There is also provided a computing device capable of measuring leaf stomata.

18 Claims, 8 Drawing Sheets

(56) References Cited

U.S. PATENT DOCUMENTS

| | | | | |
|---|---|---|---|---|
| 2014/0137277 | A1* | 5/2014 | Hymus | C12N 15/8273 800/260 |
| 2015/0027044 | A1* | 1/2015 | Redden | A01M 21/046 47/58.1 R |
| 2015/0313090 | A1* | 11/2015 | Weiss | A01G 7/045 250/453.11 |
| 2015/0315606 | A1* | 11/2015 | Schroeder | C12N 15/8261 800/286 |

OTHER PUBLICATIONS

Sanyal, Pritimoy, Ujjwal Bhattacharya, and Samir K. Bandyopadhyay. "Analysis of sem images of stomata of different tomato cultivars based on morphological features." In Modeling & Simulation, 2008. AICMS 08. Second Asia International Conference on, pp. 890-894. IEEE, 2008.*

Da Silva Oliveira, Marcos William, Núbia Rosa da Silva, Dalcimar Casanova, Luiz Felipe Souza Pinheiro, Rosana Marta Kolb, and Odemir Martinez Bruno. "Automatic Counting of Stomata in Epidermis Microscopic Images." (2014).*

Savvides, Andreas, Dimitrios Fanourakis, and Wim van Ieperen. "Co-ordination of hydraulic and stomatal conductances across light qualities in cucumber leaves." Journal of Experimental Botany 63, No. 3 (2012): 1135-1143.*

Laga, Hamid, Fahimeh Shahinnia, and Delphine Fleury. "Image-based plant stomata phenotyping." PhD diss., IEEE Press, 2014.*

Franks, Peter J., and David J. Beerling. "Maximum leaf conductance driven by CO2 effects on stomatal size and density over geologic time." Proceedings of the National Academy of Sciences 106, No. 25 (2009): 10343-10347.*

Omasa, Kenji, and Morio Onoe. "Measurement of stomatal aperture by digital image processing." Plant and cell physiology 25, No. 8 (1984): 1379-1388.*

Giday, Habtamu, Katrine H. Kjaer, Dimitrios Fanourakis, and Carl-Otto Ottosen. "Smaller stomata require less severe leaf drying to close: a case study in Rosa hydrida." Journal of Plant Physiology 170, No. 15 (2013): 1309-1316.*

Roth-Nebelsick, Anita, Michaela Grein, Torsten Utescher, and Wilfried Konrad. "Stomatal pore length change in leaves of Eotrigonobalanus furcinervis (*Fagaceae*) from the Late Eocene to the Latest Oligocene and its impact on gas exchange and $Co_2$ reconstruction." Review of Palaeobotany and Palynology 174 (2012): 106-112.*

Frey, Beat, Christoph Scheidegger, Madeleine S. Günthardt-Goerg, and Rainer Matyssek. "The effects of ozone and nutrient supply on stomatal response in birch (*Betula pendula*) leaves as determined by digital image-analysis and X-ray microanalysis." New Phytologist 132, No. 1 (1996): 135-143.*

Kaiser, Hartmut. "The relation between stomatal aperture and gas exchange under consideration of pore geometry and diffusional resistance in the mesophyll." Plant, cell & environment 32, No. 8 (2009): 1091-1098.*

Hetherington, Alistair M., and F. Ian Woodward. "The role of stomata in sensing and driving environmental change." Nature 424, No. 6951 (2003): 901-908.*

Jarvis, A. J., T. A. Mansfield, and William J. Davies. "Stomatal behaviour, photosynthesis and transpiration under rising CO2." Plant, Cell & Environment 22, No. 6 (1999): 639-648.*

Farquhar, Graham D., and Thomas D. Sharkey. "Stomatal conductance and photosynthesis." Annual review of plant physiology 33, No. 1 (1982): 317-345.*

* cited by examiner

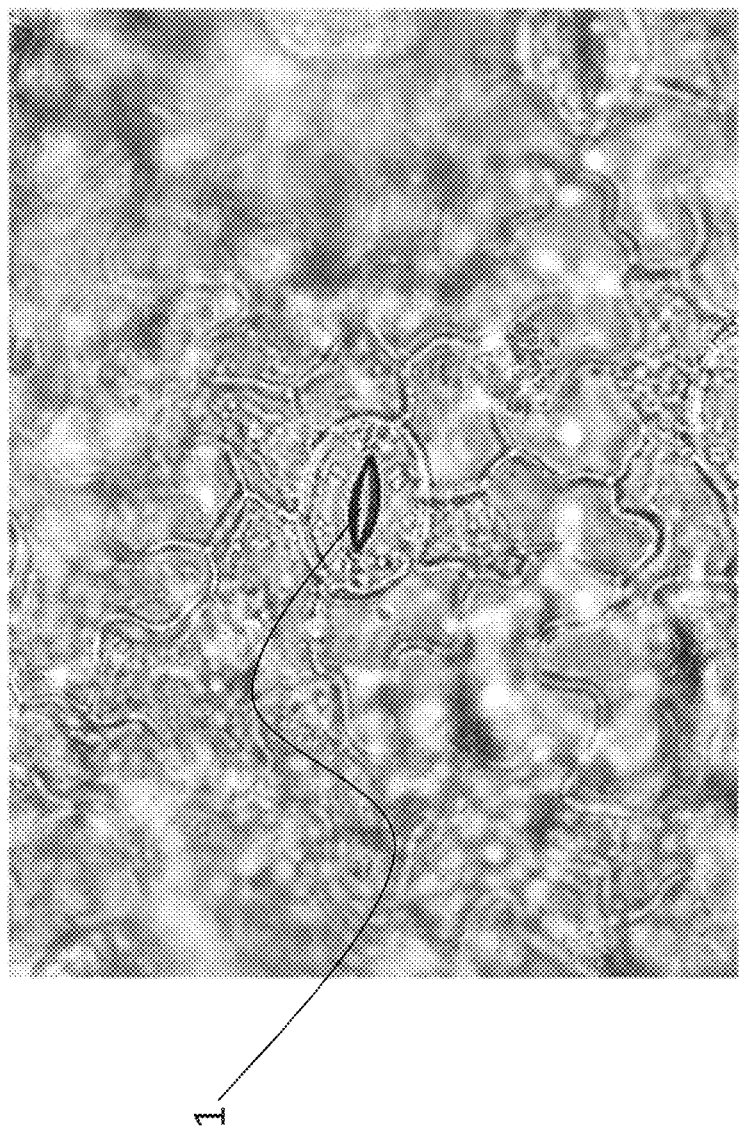
Figure: 3

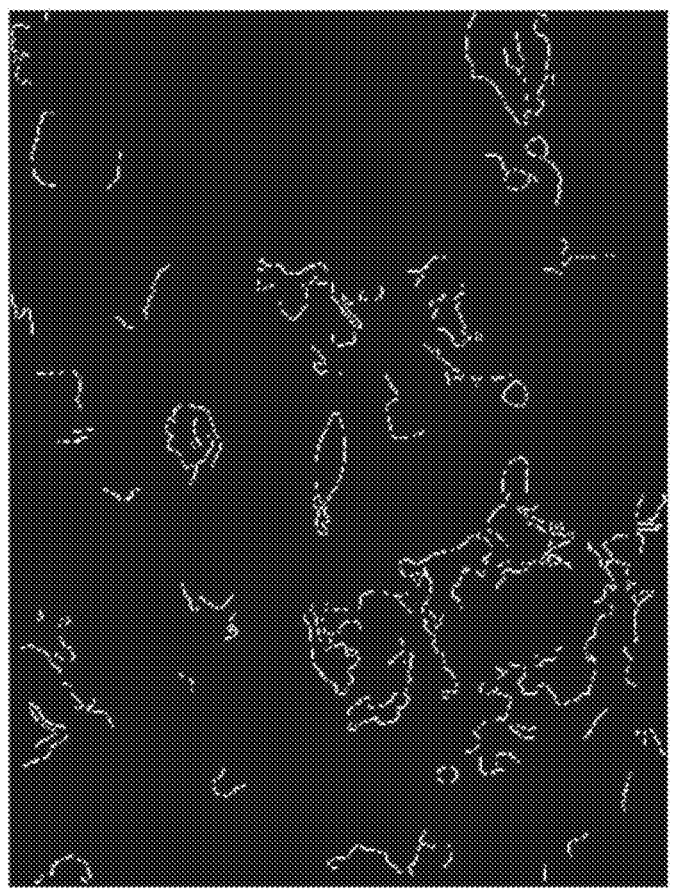
Figure: 5

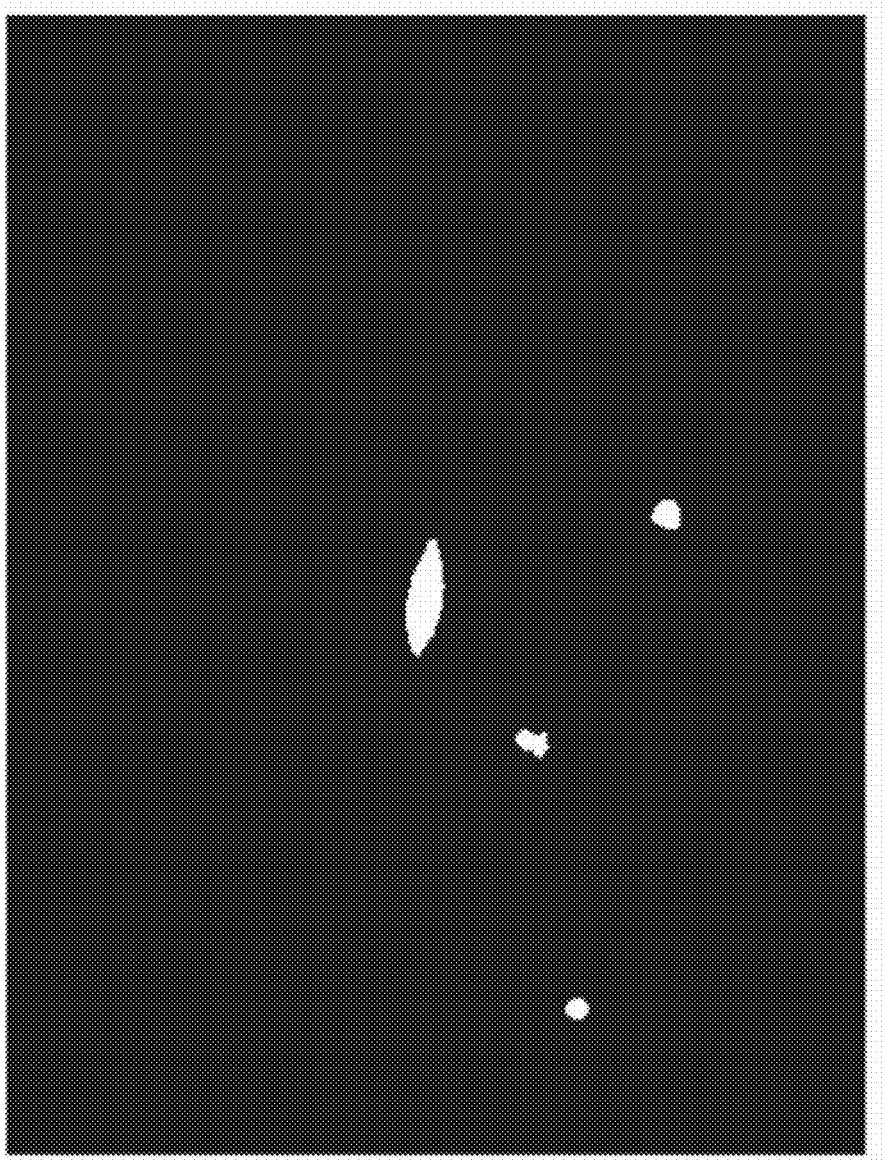
Figure: 6

Figure: 7

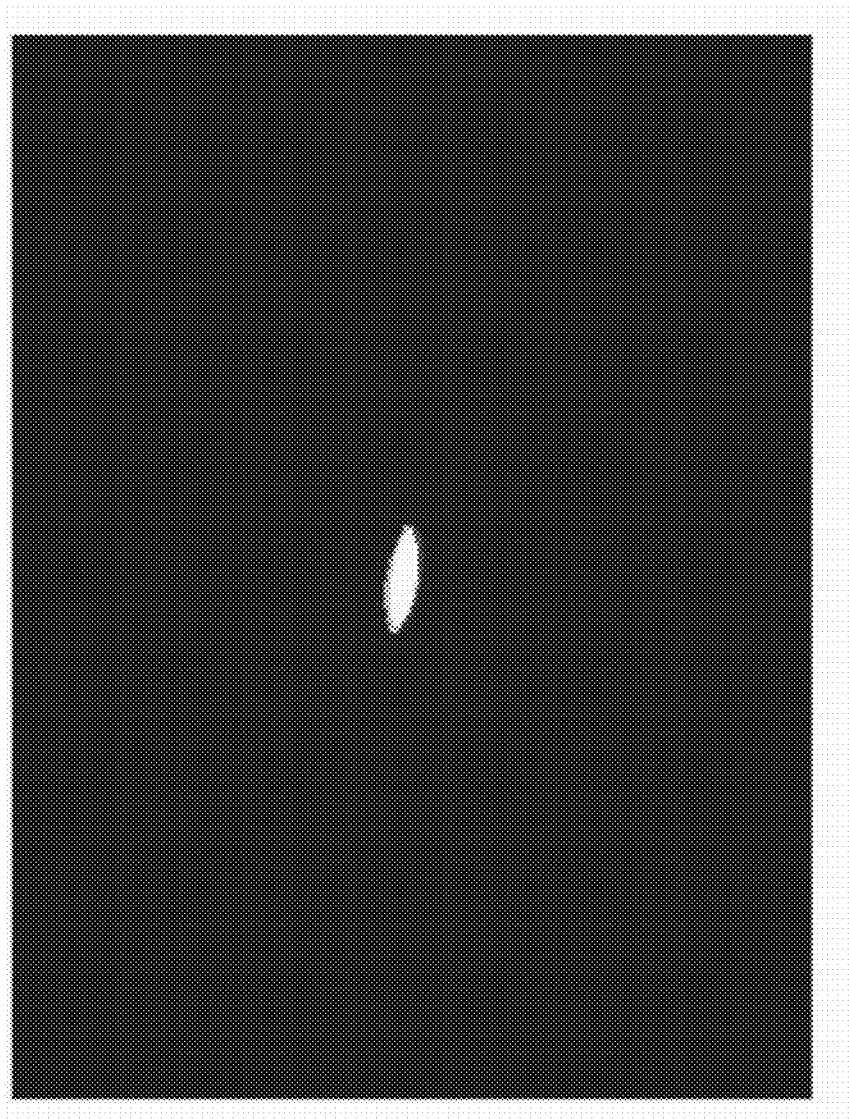
Figure: 8

PROCESS AND DEVICE FOR DIRECT MEASUREMENTS OF PLANT STOMATA

FIELD OF THE INVENTION

The present invention relates to a method for measuring stomata dimensions in plants, and more particularly to a method and system for directly determining and measuring the size of stomata in plant leaves.

BACKGROUND OF THE INVENTION

Stomata are tiny apertures or pores in the leaf epidermis, which allows $CO_2/O_2$ exchange to control the process of photosynthesis. Both photosynthesis and the gas exchange that powers it are essential to the plant's survival. Opening and closure of stomata are important mechanisms that plants use to control the diffusion of gases in and out of leaves. Ideally, stomata must be sufficiently open to allow enough $CO_2$ (needed for photosynthesis) to diffuse in, but sufficiently closed to prevent too much evaporative loss of $H_2O$. This is sometimes a difficult balance to achieve and the amount of stomata opening is controlled by a large number of factors.

There is a great interest in the scientific community to measure the dimensions, frequency, density and rates of gas exchange of these natural openings. To date, indirect methods using image processing, are the most commonly used to measure stomata dimensions. A picture is usually taken under a microscope and measurements are done on leaf imprints. It is crucial to note that leaf damage is usually the result of such techniques. This, in turn, will affect the leaf structure and more likely the stomata measurements. Stomata dimensions are usually done on a screen using image-editing packages, such as ImageJ and MultiSpec. The most advanced and widely adopted method has been used to estimate stomata openings by indirectly assessing leaf gas exchange potentials. This sophisticated indirect method involves very expensive and bulky apparatus such as LICOR6400 Portable Photosynthesis and Fluorescence System. Less sophisticated apparatus such as the portable CI-340 Handheld Photosynthesis System (CID, 2015) has been promoted as a surrogate method to assess stomata efficiency in gas exchange. These types of instruments measure attributes such as photosynthesis, transpiration, stomata conductance, and internal $CO_2$ concentration in open or closed environments.

So far, the current technologies failed to suggest a direct and precise measurement techniques to accurately detect the stomata in the epidermis of a plant leaf and to precisely measure parameters and/or dimensions thereof.

SUMMARY OF THE INVENTION

Therefore there is a need for a system and a method able to detect and outline the stomata depicted in an image captured from the epidermis of a plant leaf. In addition, there is a need to provide a comprehensive study of stomata structural characteristics and to enhance the accuracy of the image captured for the epidermis of a plant leaf. Finally, there is a need to provide a highly innovative system able to find, process and analyze any kind of captured image related to the leaf epidermis of a plant, regardless of its quality.

As a first aspect of the present invention, there is provided a computer-implemented method for detecting and measuring stomata present in the epidermis of a plant leaf, the method comprising:

a. obtaining an image of the epidermis of a plant leaf;
b. detecting valid stomata candidates within the image;
c. determining physical dimensions of the valid stomata candidates; and
d. determining vital functions of the plant based on the physical dimensions of the valid stomata candidates.

In a preferred embodiment of the present invention, the detection process of the valid stomata candidates comprises:
using Gaussian and morphological filtering processes for enhancing quality of the image;
using segmentation processes for determining possible stomata candidates;
using region filtering processes for determining the valid stomata candidates from the possible stomata candidates; and
using elliptical shape measurements for determining the physical dimensions of the valid stomata candidates.

Preferably, the morphological filtering process comprises Opening-By-Reconstruction and Opening-Closing by Reconstruction.

In a still preferred embodiment, the segmentation processes comprises:
an edge detection process, a morphological operation process and a connected component analysis process for detecting objects within the image; and
a region of interest (ROI) detection process for determining whether the size of the objects are within a predefined stomata size range threshold and for determining the possible stomata candidates based on said comparison.

In a still preferred embodiment of the present invention, the region filtering process comprises, for each possible stomata candidate:
determining if said possible candidate has an elliptical shape region;
if an elliptical shape region is found, determining if said possible stomata candidate has a deficiency region outside said elliptical shape region;
comparing the size of said deficiency region to a predefined deficiency region size threshold; and
selecting said possible stomata candidate as a positive candidate only if it has an elliptical shape region and if the deficiency region is smaller than the predefined deficiency region size threshold.

Preferably, said determination of the elliptical shape region is conducted by measuring the major and minor axes of the possible candidate, by determining the ratio between the minor and major axes, and by concluding to an elliptical shape region if the ratio is determined to be less than 1. More preferably, the determination of the physical dimensions of the valid stomata candidates using elliptical shape measurements comprises using the major and minor axes measurements made during the elliptical shape region determination process.

In another embodiment of the present invention, the obtained image is a gray scale image having an intensity resolution defining intensity of the pixels of the image, wherein the edge detection process is conducted based on the intensity of the pixels.

Preferably, the vital functions comprise at least one of a density, frequency and rate of gas exchange of the stomata.

The present invention also relates to a computing device for detecting and measuring stomata present in the epidermis of a plant leaf, the computing device being adapted for:

a. obtaining an image of the epidermis of a plant leaf;
b. detecting valid stomata candidates within the image;

c. determining physical dimensions of the valid stomata candidates;

d. determining vital functions of the plant based on the physical dimensions of the valid stomata candidates.

In a preferred embodiment, in the computer device of the present invention, the detection process of the valid stomata candidates comprises:

using Gaussian and morphological filtering processes for enhancing quality of the image;

using segmentation processes for determining possible stomata candidates;

using region filtering processes for determining the valid stomata candidates from the possible stomata candidates; and using elliptical shape measurements for determining the physical dimensions of the valid stomata candidates.

In a preferred embodiment, the morphological filtering process comprises Opening-By-Reconstruction and Opening-Closing by Reconstruction.

In a still preferred embodiment, the segmentation processes comprise:

an edge detection process, a morphological operation process and a connected component analysis process for detecting objects within the image; and a region of interest (ROI) detection process for determining whether the size of the objects are within a predefined stomata size range threshold and for determining the possible stomata candidates based on said comparison.

In another embodiment, the region filtering process comprises, for each possible stomata candidate:

determining if said possible candidate has an elliptical shape region;

if an elliptical shape region is found, determining if said possible stomata candidate has a deficiency region outside said elliptical shape region;

comparing the size of said deficiency region to a predefined deficiency region size threshold; and selecting said possible stomata candidate as a positive candidate only if it has an elliptical shape region and if the deficiency region is smaller than the predefined deficiency region size threshold.

Preferably, said determination of the elliptical shape region is conducted by measuring the major and minor axes of the possible candidate, by determining the ratio between the minor and major axes, and by concluding to an elliptical shape region if the ratio is determined to be less than 1. Preferably, the determination of the physical dimensions of the valid stomata candidates using elliptical shape measurements comprises using the major and minor axes measurements made during the elliptical shape region determination process.

In a more preferred embodiment, the obtained image is a gray scale image having an intensity resolution defining intensity of the pixels of the image, wherein the edge detection process is conducted based on the intensity of the pixels. Preferably, the vital functions comprise at least one of a density, frequency and rate of gas exchange of the stomata.

BRIEF DESCRIPTION OF THE DRAWINGS

FIG. 3 illustrates a gray scale image of a stoma in accordance with an embodiment of the invention.

FIG. 5 illustrates edge detection image in accordance with an embodiment of the invention.

FIG. 6 illustrates morphological operation image in accordance with an embodiment of the invention.

FIG. 7 illustrates segmented candidates in accordance with an embodiment of the invention.

FIG. 8 illustrates a selected segmented stoma in accordance with an embodiment of the invention.

DETAILED DESCRIPTION OF THE INVENTION

Figure 1:
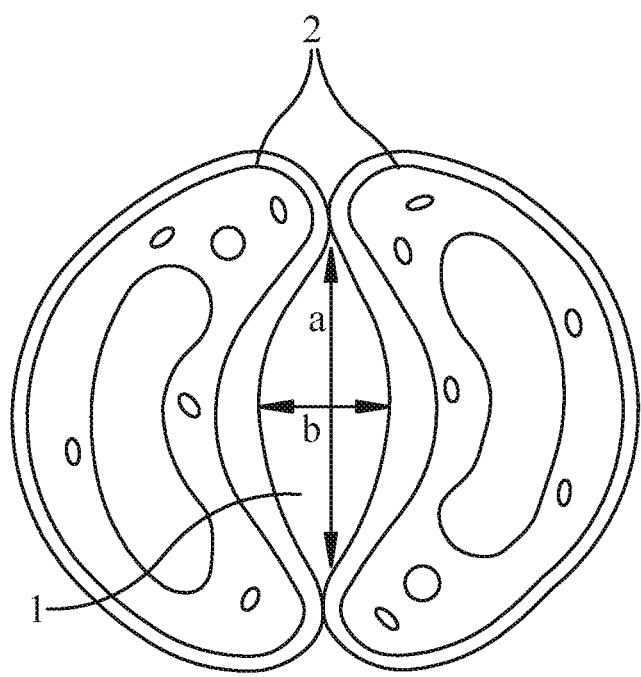
FIG. 1 illustrates a stoma structure in accordance with an embodiment of the invention.

FIG. 1 depicts the stoma structure and its related components. Stoma 1 is a small adjustable opening from which a plant exchanges gases, including water vapour, with its surroundings. These natural pores, located in the lower epidermis within the leaf, are the main exchange sites between the plant and the environment. Stomata openings are controlled by two tiny structures, referred to as guard cells 2. The guard cells 2 are responsible for the opening and closing of the stoma 1. Understanding the mechanism of their openings is critical as they are important for plant diffusion. They control the opening length a) and the opening width b) of the stoma as well as the opening duration and the timing during a specific day.

The dimensions of the stoma are in the order of around 20 to 1500 microns. Due to their tiny sizes, there are thousands of stomata 1 per square millimeter of the leaf epidermis. Consequently, their high densities are essential for the plant to grow, develop, photosynthesize and reproduce. Thus, measuring stomata dimensions remain a challenging task for scientists. They are continuously studying the dimensions, frequency, density and rates of gas exchange of these openings.

The system of the present invention is configured to detect, outline and measure the stomata directly without passing through indirect methods such as the measurement of gas exchange.

Figure 2:
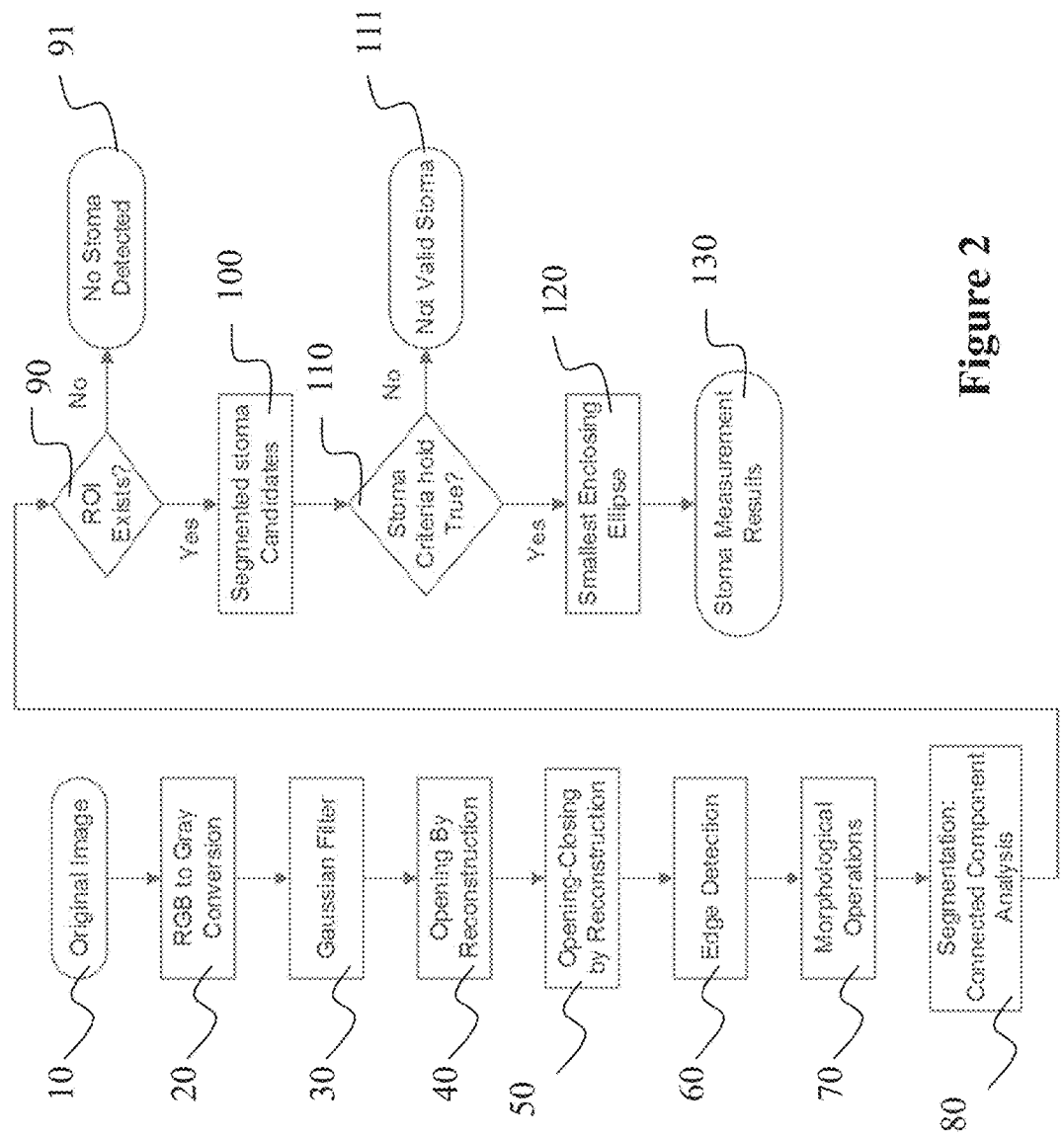
FIG. 2 is a bloc diagram illustrating steps for detecting and measuring the stomata parameters in accordance with an embodiment of the invention.

FIG. 2 illustrates a block diagram showing the different steps for detecting and measuring the dimensions of plant stomata according to one embodiment of the present invention. An image of a plant leaf sample 10 is taken using an imaging device. The image generated is a partial region of the epidermis of the plant leaf where various stomata are present. The step of capturing the image is conducted using a suitable imaging device adapted to capture micro level images. The imaging device can be any camera capable of capturing micro level structures.

Once the image is captured 10, the image is converted for obtaining a digital representation of the image in a gray scale 20. This consists in converting the true colour image into the gray scale intensity image by eliminating saturation information while retaining the luminance. The gray level resolution of the image obtained is preferably 8-bit gray scale or higher. Each pixel of the image would therefore have 256 gray scale intensity representation or more.

FIG. 3 illustrates a gray scale image of a stoma 1 according to the present invention. The data image conversion is processed using an RGB to gray scale converter.

The gray scale image obtained in step 20 may have noises in the image. In order to remove such noises, specific filters are applied to enhance the image quality. As part of the image enhancement process, the image is first processed by a Gaussian filter 30 in order to reduce/eliminate Gaussian noise and enhance quality.

Morphological filtering is then applied to the image filtered in step 30 in order to better define the shapes of objects/structures within the image in the purpose of potentially differentiating the stomata structures from the other components and determining their positions. In an embodiment of the invention, the morphological filtering comprises filtering by Opening-By-Reconstruction 40 and filtering by Opening-Closing-By-Reconstruction 50.

Figure 4A:
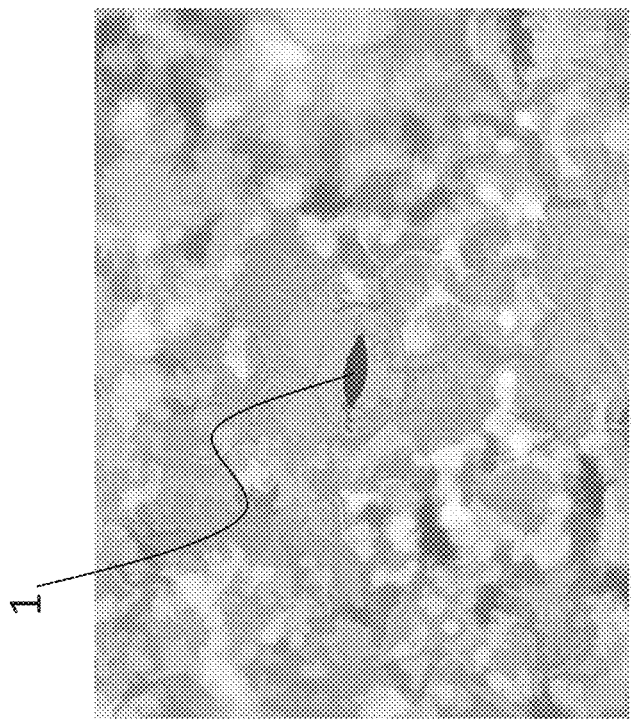
FIGS. 4a and 4b illustrate images of a stoma after filtering process in accordance with an embodiment of the invention.
Figure 4B:
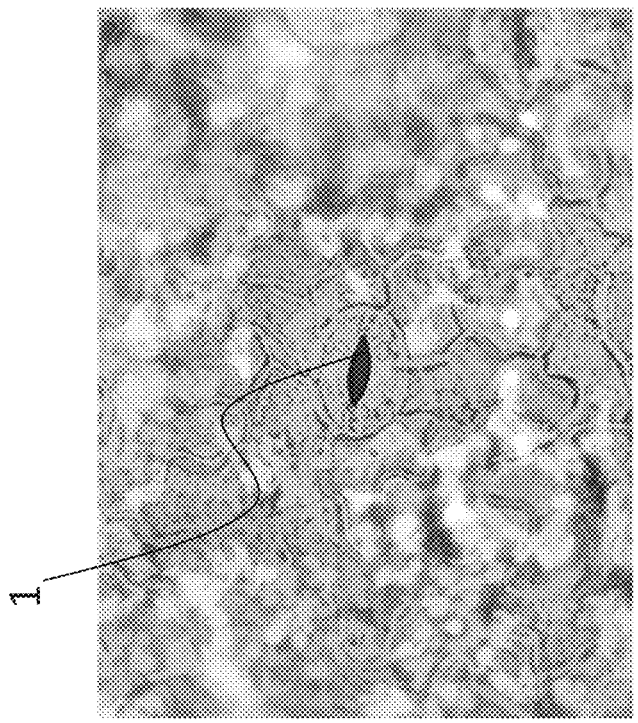

FIGS. 4a and 4b illustrate examples of a filtered plant leaf gray scale image using the Opening-By-Reconstruction filtering and the Opening-Closing-By-Reconstruction filtering, respectively. This kind of filtration based on morphological reconstruction is considered to be extremely useful especially for the gray scale images since it helps in defining/emphasizing the shapes of all objects present in the plant leaf sample including the stomata. This type of filtering is also required in order to potentially differentiate and determine the positions of the stomata with respect to the other components present in the plant leaf sample. The stomata structures 1 become clearly distinguishable and their positions identifiable from the other components after the image enhancement process as illustrated in FIGS. 4a and 4b.

Once the gray scale image is enhanced by noise reduction and morphological reconstruction according to the processes mentioned above, the stomata present in the epidermis of the plant leaf are detected and outlined using a segmentation process. This process comprises first detecting the edges of the objects depicted in the gray scale image 60 and then conducting morphological operations 70 and connected component analysis 80 to detect and draw the outline or contours of all the objects highlighted in said image.

Edge detection consists essentially of detecting and locating the boundaries of the objects within the image. These objects would comprise the stomata 1, guardian cells 2 as well as other components of the plant leaf sample. The edge detection process comprises detecting significant local changes in the intensity of all the pixels within the image and identifying those pixels which correspond to a predefined intensity threshold which are indicative of the presence of edges of objects within the image. FIG. 5 illustrates an image after application of the edge detection process.

FIG. 6 illustrates an image of the plant leaf sample after application of the morphological operations 70 and the connected component analysis 80.

Segmentation process can be achieved using suitable segmentation algorithms such as watershed algorithms, active contours algorithm and connected component analysis algorithms.

Once the image passes through the edge detection process 60, the morphological operations process 70 and the connected component analysis process 80, the image is then processed to assess the possible candidates based on a region of interest (ROI) analysis 90. The ROI process consists of determining the size of each identified object (number of pixels) and comparing the size of the objects to a predefined size range (number of pixels). The predefined size range corresponds to the size range of stomata according to statistical study. If the size of the object is within this size range, then the object is selected as a possible stomata candidate 100. If the size of the object falls outside of this size range, then the object is eliminated and excluded from the possible candidate selection 91. The predefined size range of the threshold value depends on the image source. For example, for the image source Olympus DP71 Camera that is fitted to Light microscopy Olympus BX41 with a 100× magnification which is used for the stoma photo investigated in this work the corresponding predefined size range of the threshold value is 10-90 pixels. This means that if the calculated number of pixels is within this range, then a possible stoma candidate is selected for future analysis. Otherwise it is considered that no stoma has been detected.

FIG. 7 illustrates an image of the plant leaf with the possible stomata candidates after application of the ROI process 90. The objects illustrated in FIG. 7 are considered to be possible stomata candidates which will be subject to further processing and selection as detailed below.

Once the possible stomata candidates are selected, the image is subjected to a region filtering process. The region filtering comprises first measuring the small and large axis of each possible candidate and determining the ratio between the small and large axis. Then, a deficiency area within the object is determined by measuring the size of the region outside the elliptical shape (the deficiency zone). If the ratio between the small and large axis is below 1 and the deficiency zone is smaller than a certain deficiency zone predefined threshold, it means that the possible candidate has an elliptical shape and has an acceptable deficiency zone and therefore it is a positive stoma candidate 120. If the deficiency zone is bigger than the predefined deficiency zone threshold, then the possible candidate is eliminated as not a valid stoma 111 even if the ratio between the small and large axis is less than 1. Also, if the ratio is equal to 1, it means it has a circular shape and is not a positive stoma candidate and is therefore eliminated as not a valid stoma 111. These objects determined to be invalid stomata candidates can be guard cells, nucleus, vacuole or other components.

FIG. 8 illustrates an image of the plant leaf sample with the positive stoma candidate selected.

Stomata are known to have an elliptical shape having two perpendicular axes, the larger one called the major axis and the smallest one called the minor axis. FIG. 1 illustrates a stoma shape highlighting the major axis (a), and the minor axis (b). The valid segmented stomata are then selected based on the elliptical shape thereof and therefore stomata are selected only and if the ratio of major axis a with respect to the minor axis b is more than 1 and if the deficiency area is smaller than a predefined deficiency zone size.

The last step of the process is determining the dimensions of the positive stomata selected 130 by determining the dimensions of the ellipses enclosed within the valid stomata candidates. Other parameters are also determined such as shape, major/minor axis, size, etc. . . . . These parameters are extremely useful for determining the functions of the plant based on the parameters of the stomata, such as the density, frequency and rates of gas exchange of these openings, for example, for controlling the process of photosynthesis.

Table 1 shows the comparison between the measurements obtained for the stomata depicted in FIG. 8 based on two techniques: regular manual technique and measurements obtained by the system/process of the present invention:

TABLE 1

| Stomata | Regular Manual Technique | System/Process of the present invention |
|---|---|---|
| Bottom right | Length: 14.42 μm<br>Width: 5.37 μm | Length: 12.1085 μm<br>Width: 5.0575 μm |
| Top left | Length: 10.19 μm<br>Width: 3.53 μm | Length: 9.874 μm<br>Width: 3.2754 μm |

As it can be seen from the table, the measurement of the stoma dimension using the system/process of the present invention is much more precise and accurate than the manual conventional one. The reason behind that our system measures the exact opening/closure of the stomata. Said accurate measures are extremely important for biologist scientists to use them as basis for analysing and studying the plant growth, and the development and reproduction in a most efficient and accurate way.

The invention claimed is:

1. A computer-implemented method for directly detecting valid stomata candidates present in an epidermis of a plant leaf and determining physical dimensions of the valid stomata candidates, the method comprising:
   a. obtaining an image of the epidermis of a plant leaf using an imaging device;
   b. detecting and outlining possible stomata candidates within the image through a segmentation process;
      wherein the segmentation process comprises drawing outlines or contours of objects highlighted within the image;
   c. selecting valid stomata candidates from the possible stomata candidates based on an elliptical shape region and a predefined deficiency region size threshold, through a region filtering process;
   d. determining physical dimensions of the selected valid stomata candidates using elliptical shape measurements; and
   e. determining vital functions of the plant leaf based on the determined physical dimensions of the valid stomata candidates to measure multiple plant attributes comprising plant diffusion, photosynthesis and stomata conductance, wherein the valid stomata candidates are directly detected, outlined and measured without a measurement of gas exchange.

2. The computer-implemented method of claim 1, wherein the detecting of valid stomata candidates further comprises:
   using Gaussian and morphological filtering processes for enhancing quality of the image;
      wherein the morphological filtering processes differentiate and determine positions of stomata with respect to other components present in the plant leaf; and
      the other components present in the plant leaf comprise guard cells, nucleus or vacuole.

3. The computer-implemented method of claim 2, wherein the morphological filtering processes comprise Opening-By-Reconstruction and Opening-Closing-By-Reconstruction.

4. The computer-implemented method of claim 1, wherein the segmentation process further comprises:
   an edge detection process, a morphological operation process and a connected component analysis process for detecting objects within the image; and
   a region of interest (ROI) detection process for determining whether a size of the objects is within a predetermined stomata size range threshold and for determining the possible stomata candidates based on said determination of whether the size of the objects is within the predetermined stomata size range threshold.

5. The computer-implemented method of claim 1, wherein the region filtering process comprises, for each possible stomata candidate:
   determining if said possible stomata candidate has said elliptical shape region;
   if said elliptical shape region is found, determining if said possible stomata candidate has a deficiency region outside said elliptical shape region;
   comparing the size of said deficiency region to the predefined deficiency region size threshold; and
   selecting said possible stomata candidate as a positive candidate only if it has an elliptical shape region and if the deficiency region is smaller than the predefined deficiency region size threshold.

6. The computer-implemented method of claim 5, wherein said determining if said possible stomata candidate has the elliptical shape region is conducted by measuring the major and minor axes of the possible candidate, by determining a ratio between the minor and major axes, and by concluding to an elliptical shape region if the ratio is determined to be less than 1.

7. The computer-implemented method of claim 6, wherein the using elliptical shape measurements for determining the physical dimensions of the valid stomata candidates comprises using the major and minor axes measurements made during the determining if said possible stomata candidate has an elliptical shape region.

8. The computer-implemented method of claim 7, wherein the obtained image is a gray scale image having an intensity resolution defining intensity of the pixels of the image, wherein the edge detection process is conducted based on the intensity of the pixels.

9. The computer-implemented of claim 8, wherein the vital functions comprise at least one of a density, frequency and rate of gas exchange of the stomata.

10. A system for directly detecting valid stomata candidates present in an epidermis of a plant leaf and determining physical dimensions of the valid stomata candidates, the system comprising a processor for:
    a. obtaining an image of the epidermis of a plant leaf;
    b. detecting and outlining possible stomata candidates within the image through a segmentation process;
       wherein the segmentation process comprises drawing outlines or contours of objects highlighted within the image;
    c. selecting valid stomata candidates from the possible stomata candidates based on an elliptical shape region and a predefined deficiency region size threshold, through a region filtering process;
    d. determining physical dimensions of the selected valid stomata candidates using elliptical shape measurements; and
    e. determining vital functions of the plant leaf based on the determined physical dimensions of the valid stomata candidates to measure multiple plant attributes comprising plant diffusion, photosynthesis and stomata conductance, wherein the valid stomata candidates are directly detected, outlined and measured without a measurement of gas exchange.

11. The system of claim 10, wherein the detecting of valid stomata candidates further comprises:
    using Gaussian and morphological filtering processes for enhancing quality of the image;
       wherein the morphological filtering processes differentiate and determine positions of stomata with respect to other components present in the plant leaf; and
       the other components present in the plant leaf comprise guard cells, nucleus or vacuole.

12. The system of claim 11, wherein the morphological filtering processes comprise Opening-By-Reconstruction and Opening-Closing-By-Reconstruction.

13. The system of claim 11, wherein the segmentation process further comprises:
- an edge detection process, a morphological operation process and a connected component analysis process for detecting objects within the image; and
- a Region of Interest (ROI) detection process for determining whether a size of the objects is within a predetermined stomata size range threshold and for determining the possible stomata candidates based on said determination of whether the size of the objects is within the predetermined stomata size range threshold.

14. The system of claim 10, wherein the region filtering process comprises, for each possible stomata candidate:
- determining if said possible stomata candidate has said elliptical shape region;
- if said elliptical shape region is found, determining if said possible stomata candidate has a deficiency region outside said elliptical shape region;
- comparing the size of said deficiency region to the predefined deficiency region size threshold; and
- selecting said possible stomata candidate as a positive candidate only if it has an elliptical shape region and if the deficiency region is smaller than the predefined deficiency region size threshold.

15. The system of claim 14, wherein said determining if said possible stomata candidate has the elliptical shape region is conducted by measuring the major and minor axes of the possible candidate, by determining a ratio between the minor and major axes, and by concluding to an elliptical shape region if the ratio is determined to be less than 1.

16. The system of claim 15, wherein the using elliptical shape measurements for determining the physical dimensions of the valid stomata candidates comprises using the major and minor axes measurements made during the determining if said possible stomata candidate has an elliptical shape region.

17. The system of claim 16, wherein the obtained image is a gray scale image having an intensity resolution defining intensity of the pixels of the image, wherein the edge detection process is conducted based on the intensity of the pixels.

18. The system of claim 17, wherein the vital functions comprise at least one of a density, frequency and rate of gas exchange of the stomata.

\* \* \* \* \*